United States Patent [19]

Leach et al.

[11] 3,917,808

[45] Nov. 4, 1975

[54] METHOD FOR EXTRUDING ALUMINA

[75] Inventors: Bruce E. Leach; George G. Hritz, both of Ponca City, Okla.

[73] Assignee: Continental Oil Company, Ponca City, Okla.

[22] Filed: Feb. 5, 1973

[21] Appl. No.: 329,925

Related U.S. Application Data

[63] Continuation-in-part of Ser. No. 298,169, Oct. 16, 1972, abandoned.

[52] U.S. Cl. .............. 423/626; 423/630; 423/631; 264/176; 252/463
[51] Int. Cl. ............................................. C01f 7/02
[58] Field of Search ............ 423/625, 626, 630–631; 264/176 F

[56] References Cited
UNITED STATES PATENTS

| | | | |
|---|---|---|---|
| 2,411,806 | 11/1940 | Riesmeyer et al. | 423/626 X |
| 2,809,170 | 10/1957 | Cornelius et al. | 423/631 X |
| 3,353,910 | 11/1967 | Cornelius et al. | 423/626 X |
| 3,385,663 | 5/1968 | Hughes | 423/626 |
| 3,679,605 | 7/1972 | Sanford et al. | 252/463 |
| 3,773,691 | 11/1973 | Leach | 423/625 |
| 3,804,781 | 4/1974 | Colgan | 252/463 |

*Primary Examiner*—Herbert T. Carter
*Attorney, Agent, or Firm*—F. Lindsey Scott

[57] ABSTRACT

A method for extruding alpha alumina monohydrate by admixing with the alumina from about 0.01 to about 1.1 equivalents per kilogram of $Al_2O_3$ of a monoprotic acid, from about 0.01 to about 2.7 equivalents per kilogram of $Al_2O_3$ of a polyprotic acid or salts thereof and an effective amount of water to form a mixture of uniform consistency and thereafter extruding said mixture and recovering alumina extrudates.

10 Claims, No Drawings

METHOD FOR EXTRUDING ALUMINA

This application is a continuation-in-part of our earlier filed application U.S. Ser. No. 298,169 entitled "Method for Extruding Alumina" filed Oct. 16, 1972, now abandoned.

BACKGROUND OF THE INVENTION

1. Field of the Invention

This invention relates to methods for extruding alumina. This invention further relates to methods for extruding alpha alumina monohydrate. This invention further relates to a method for extruding alpha alumina monohydrate by forming mixtures of the alumina with monoprotic acids, polyprotic acids or salts thereof and water. This invention further relates to a method for extruding low density alumina by forming mixtures of such low density alumina with monoprotic acids or salts thereof and water to form extrudable mixtures.

2. Prior Art

Alumina is produced by a variety of processes and is useful as a catalyst, catalyst supports and the like. For many of these uses extrudates are particularly desirable, therefore, numerous methods for the extrusion of alumina have been proposed. Alumina useful as a catalyst, catalyst support and the like is generally of a gel nature or a crystalline nature. Aplha alumina monohydrate having a substantially gel character is produced by the water hydrolysis of aluminum alkoxides and is particularly desirable as a catalyst material. Such alumina may be further classified as high density or low density material. Normally the higher density alpha alumina monohydrate has a loose bulk density greater than about 35 lb/ft$^3$. Such alumina is available as an article of commerce and is readily extrudable by means well known in the art such as the addition of monoprotic acids and water to form extrudable mixtures and thereafter extruding.

Low density alpha alumina monohydrate is produced by a process comprising contacting aqueous slurries of alumina with a suitable organic solvent having a lower surface tension than water and thereafter drying to produce alpha alumina monohydrate having a low loose bulk density. Such alumina typically has a loose bulk density from about 10 lb/ft$^3$ to about 35 lb/ft$^3$.

Such alumina is extrudable by admixture with suitable quantities of monoprotic acids and water to form extrudable mixtures which are thereafter extruded and dried.

In the extrusion methods described above some disadvantages are observed. In the extrusion of the higher density alumina by the technique described the product extrudates exhibit a high degree of shrinkage upon drying and upon immersion in water have been observed to disintegrate rapidly. This disadvantage makes the impregnation of such extrudates with catalytic elements by dunking the extrudates in aqueous solutions of the catalytic elements difficult if not impossible. In addition, it is difficult to control the acid addition precisely enough to produce a readily extrudable mixture reliably.

In the extrusion of the low density alumina material, it has been observed that by the method described above, relatively low crush strengths are obtained.

In light of the desirability of the alpha alumina monohydrate extrudates for catalysts, catalyst supports and the like, a continuing effort has been directed to the development of improved methods for providing alpha alumina monohydrate extrudates which do not suffer the disadvantages of the methods discussed above.

OBJECTS OF THE INVENTION

It is an object of the present invention to provide a method for extruding alumina. A further objective of the present invention is to provide a method for extruding alumina wherein the alumina extrudates have improved crush strengths, reduced shrinkage and the like. A further objective of the present invention is to provide a method for extruding alumina wherein the mechanical difficulties in mechanically mulling and extruding the alumina are minimized.

SUMMARY OF THE INVENTION

It has now been found that the objectives of the present invention are accomplished in a method for extruding alpha alumina monohydrate consisting essentially of admixing with said alpha alumina monohydrate from about 0.01 to about 1.1 equivalents per kilogram of $Al_2O_3$ of a monoprotic acid, from about 0.01 to about 2.7 equivalents per kilogram of $Al_2O_3$ of a polyprotic acid or salts thereof and an effective amount of water to form a mixture of uniform consistency, extruding said mixture and recovering alpha alumina monohydrate extrudates.

DESCRIPTION OF PREFERRED EMBODIMENTS

Alumina useful in the method of the present invention is alpha alumina monohydrate having a gel character. Especially desirable alpha alumina monodyrate is that derived from the water hydrolysis of aluminum alkoxides produced by the Ziegler process. One such alumina is marketed by Continental Oil Company, 1300 Main Street, Houston, Texas under the trademark "CATAPAL." Such alumina has a surface area of about 250 m$^2$/g, pore volume of about 0.53 cc/g, a loose bulk density of about 43 lb/ft$^3$ and an $Al_2O_3$ content of about 75 weight percent.

Desirable catalysts are produced by extruding such alumina to produce extrudates, calcining and thereafter dunking the extrudates in aqueous solutions of catalytic elements to produce catalysts. The catalysts may optionally be prepared by mixing with the alumina, prior to extrusion, salts of the catalytic elements and the like. Numerous such methods are well known to those skilled in the art and need not be discussed further.

The alumina suitable in the present invention is characterized as gel alumina. Such alumina may be defined generally as an alumina which shrinks upon drying. The method of the present invention is applicable to gel aluminas generally and in particular is desirable for use with high and low bulk density aluminas and mixtures thereof as described hereinafter.

High density alumina is alumina such as "CATAPAL" alumina described hereinbefore wherein the $Al_2O_3$ content varies from about 70 to about 80 weight percent with from about 73 to about 78 weight percent $Al_2O_3$ being preferred. Such alumina may be extruded by admixing the monoprotic acid, the polyprotic acid or a salt thereof and the water with the alumina by any suitable method and thereafter mixing to form a mixture of uniform consistency suitable for extrusion. The addition of the water and acid may be by any convenient manner and may be carried out prior to or during the mixing operation. A preferred method for the addition of materials is to admix a solid polyprotic acid or polyprotic acid salt with the alumina and thereafter admix the normally liquid monoprotic acid and water so that when the water-acid mixture is added to the alumina there is little possibility of locally overpeptizing the alumina.

Monoprotic acids suitable for use in the method of the present invention are those selected from the group consisting of monoprotic inorganic acids, monoprotic aliphatic carboxylic acids containing from about 1 to about 3 carbon atoms and halogenated monoprotic aliphatic carboxylic acids containing from about 2 to about 3 carbon atoms. Some examples of such acids are hydrochloric acid, nitric acid, formic acid, propionic acid, monochloroacetic acid, dichloroacetic acid, trichloroacetic acid and the like. Of these, preferred acids are acetic acid and nitric acid.

Polyprotic acids suitable for use in the method of the present invention are those selected from the group consisting of diprotic inorganic acids, triprotic inorganic acids, diprotic carboxylic acids containing from about 2 to about 6 carbon atoms, triprotic carboxylic acids containing from about 6 to about 10 carbon atoms and polymeric acids such as hydrolyzed copolymers of ethylene and maleic anhydride. Such acids may contain in addition to carboxylic groups other groups such as hydroxyl, halide, amino and the like. Some examples of suitable diprotic acids are oxalic, malonic, sulfuric, succinic, glutaric, adipic, maleic, fumaric, tartaric and the like. Anhydrides of maleic, succinic, glutaric and adipic acids are also suitable since in aqueous solution they hydrolyze to form the corresponding acids. Of the aforementioned diprotic acids oxalic, maleic and sulfuric are preferred. Some examples of triprotic acids are phosphoric, citric, nitrilotriacetic, aminodiacetic, tricarballylic and aconitic. Of these the preferred acid is citric.

Any suitable metallic cation or ammonium may be used since the primary objective is the addition of the anionic portion of the polyprotic acid to the mixture. It is noted that the salts of polyprotic acids wherein the cationic portion is selected from the group consisting of ammonium, sodium and potassium are preferred. The polyprotic acid salts, of course, include materials which do not have all the acidic hydrogens replaced by cations other than hydrogen such as $NaH_2PO_4$, $Na_2HPO_4$, mono-ammonium citrate, dipotassium citrate, monosodium oxalate, and the like. It may be desirable in some instances to add catalytic elements such as molybdenum, cobalt and the like to the mixture by using the polyprotic acid salts of such metals. Such variations and the selection of a cation suited to the particular objectives of the user are considered well within the ability of those skilled in the art and accordingly need not be discussed further.

The acids are added to the alumina in an amount equal to from about 0.01 to about 1.1 equivalents per kilogram of $Al_2O_3$ of the monoprotic acid and from about 0.01 to about 2.7 equivalents per kilogram of $Al_2O_3$ of the polyprotic acid or polyprotic acid salt. A preferred range is from about 0.05 to about 0.55 equivalents per kilogram of $Al_2O_3$ of the monoprotic acid and from about 0.05 to about 1.4 equivalents per kilogram of $Al_2O_3$ of the polyprotic acid or polyprotic acid salt.

Low density alumina such as that produced by contacting aqueous alumina slurries produced by the hydrolysis of aluminum alkoxides produced by the Ziegler process with a suitable organic solvent having a lower surface tension than water and drying to produce alumina is suitable for extrusion by the method of the present invention. The preparation of such alumina is shown more fully in U.S. Ser. No. 191,085 entitled "High-Porosity, High-Surface Area, Low-Bulk Density Alumina" filed Oct. 20, 1971 by Ziegenhain. Special handling is necessary in the extrusion of such alumina as shown in U.S. Ser. No. 268,246 entitled "Low-Density, High-Porosity Alumina Extrudates and Methods for Producing Said Extrudates" filed July 3, 1972 by Leach et al. With proper $Al_2O_3$ adjustment the method of the present invention is applicable to the extrusion of such alumina. The acid mixtures hereinbefore described are suitable and the acid and water may be added as described hereinbefore by any convenient method.

The amount of water required is best described as an effective amount to produce a putty-like mixture for extursion. The water required with the low density alumina is usually approximately equal to the pore volume of the starting alumina material. Typical water ranges for the low density alumina are from about 0.8 to about 1.8 liters per kilogram of $Al_2O_3$. For the higher density alumina typical water requirements are from about 0.4 to about 0.8 liters per kilogram of $Al_2O_3$.

The alpha alumina monohydrate useful in the method of the present invention typically appears as a dry, solid material but may contain in addition to $Al_2O_3$, free water, water of hydration and the like. For consistency, the acid and water values discussed herein are based on the $Al_2O_3$ content. Typically the high density alumina will have an $Al_2O_3$ content from about 73 to about 78 and is not generally considered extrudable at $Al_2O_3$ contents greater than about 82 weight percent $Al_2O_3$. The low density alumina is best extruded at $Al_2O_3$ contents in excess of about 82 weight percent $Al_2O_3$ as shown in U.S. Ser. No. 268,246.

When only polyprotic acids or polyprotic acid salts are used with high density alumina, low green strengths are obtained, feathering is observed and the mixture is difficult to extrude whereas by the method of the present invention improved green strengths are obtained, reduced feathering is observed and the mixture is considerably easier to extrude.

When monoprotic acids are used for the extrusion of the higher density alumina the extrudates often tend to disintegrate rapidly in the presence of water. By the method of the present invention, using a mixture of monoprotic and polyprotic acids, this tendency is reduced to the extent that the extrudate is stable to water. This is an important advantage in that it allows the impregnation of the extrudates with catalytic elements by dunking the extrudates in liquid solutions of such elements to produce catalysts. As a further advantage it has been observed that reduced shrinkage of the extrudates is obtained by the method of the present invention.

With the low density alumina materials, it has been observed that improved crush strengths are obtained in the finished extrudate product by the method of the present invention.

The extrudates produced by the extrusion of either the low density or the high density alumina may be converted to the gamma form by calcining at 900°F for 3 hours and the like. Such calcined catalysts may readily be impregnated with catalytic elements by dunking the extrudates in solutions containing the catalytic elements and the like.

The use of polyprotic acid salts allows the formulation of alumina-polyprotic acid salt mixtures for shipment and storage as a non-acidic material for use in the method of the present invention.

The foregoing description of preferred embodiments should not be considered as limiting but rather as illustrative of the method of the present invention. Many variations and modifications are possible within the scope of the present invention and it is anticipated that many such variations and modifications may appear obvious or desirable to those skilled in the art upon a review of the foregoing description of preferred embodiments and the following examples and claims.

EXAMPLE 1

1000 g. of CATAPAL alumina having the properties described hereinbefore and produced by the water hydrolysis of aluminum alkoxides produced by the Ziegler process was admixed with 400 cc of water containing the monofunctional acids shown below in Table I. the difunctional acids were admixed with the alumina prior to the addition of the water containing the monofunctional acid. The alumina, water and acids were then mixed and an additional 300 cc of water was added. The resulting mixture was mulled for about 15 minutes and thereafter extruded into ⅛ inch (3.18 ml) diameter extrudates. The extrudates were dried at 250°F for about 24 hours and thereafter calcined at 900°F for 3 hours. The results are shown in Table I.

It will be observed that when only the monoprotic acid was used the shrinkage was considerably greater than in the examples wherein mixtures of monoprotic and polyprotic acids were used. In all cases the crush strength is suitable and the extrudates are desirable extrudates. It will be noted that in the example using formic acid different proportions of the ingredients were mixed as shown in Footnote 1.

EXAMPLE 2

Alumina produced by a process comprising (a) hydrolyzing aluminum alkoxides produced by the Ziegler process to produce an aqueous alumina slurry, (b) admixing the aqueous alumina slurry with a suitable amount of n-butanol and thereafter (c) drying to produce alumina having a loose bulk density of about 12 lb/ft$^3$, a pore volume of about 1.8 cc/g and an $Al_2O_3$ content of about 85 weight percent was mixed with acid and water in the proportions shown below and thereafter mulled to form an extrudable mixture. The polyprotic acid was added to the alumina as a dry powder and mixed therewith and thereafter the monofunctional acid was added as an aqueous solution and mixed with the alumina containing the polyfunctional acid. Additional water was thereafter added during mulling to produce the desired putty-like extrudable mixture. The mixture was then extruded and the extrudates obtained were dried at 275°F for about 24 hours and thereafter calcined at 900°F for 3 hours. The results are shown in Table II.

TABLE I

| Acids | Equivalents of Acid | Density (Lb/Ft$^3$) | Alumina Extrudate Properties Pore Volume (cc/g) | Crush(2) Strength (Lb) | Diameter (mm) | Shrinkage (%) |
|---|---|---|---|---|---|---|
| Formic(1) | 0.001 | | 0.57 | | | 31 |
| Citric | 0.04 | 40 | 0.42 | 16.4 | 2.55 | 20 |
| Acetic | 0.125 | | | | | |
| Citric | 0.08 | 43 | 0.46 | 19.7 | 2.6 | 18 |
| Acetic | 0.08 | | | | | |
| Citric | 0.12 | 38 | 0.48 | 20.8 | 2.7 | 15 |
| Acetic | 0.04 | | | | | |
| Citric | 0.13 | 41.6 | 0.50 | 21.6 | 2.7 | 15 |
| Nitric | 0.024 | | | | | |
| Oxalic | 0.12 | 43 | 0.40 | 18.8 | 2.6 | 18 |
| Acetic | 0.04 | | | | | |
| Acetic | 0.04 | 42 | 0.48 | 23.1 | 2.7 | 15 |
| Sulfuric | 0.15 | | | | | |
| Nitric | 0.04 | 40.6 | 0.47 | 22.7 | 2.6 | 18 |
| Sulfuric | 0.15 | | | | | |
| Citric | 0.31 | 35.6 | 0.54 | 17.4 | 2.7 | 15 |
| Citric | 0.31 | 37.8 | 0.054 | 13.4 | 2.65 | 17 |
| Acetic | 0.033 | | | | | |

(1)25 g of 80% $Al_2O_3$ material was mixed with 0.5 g formic acid and 35 g water.
(2)Based on a 5 mm sample of ⅛ inch diameter extrudate.

TABLE II

| Acids | Equivalents of Acid | Water (ml) | Alumina (g) | Alumina Extrudate Properties Pore Volume (cc/g) | Crush Strength (Lb) | Diameter (In) | Shrinkage (%) |
|---|---|---|---|---|---|---|---|
| Acetic | 0.025 | 723.5 | 490 | 1.13 | 6.2 | 0.117 | 6.5 |
| Oxalic | 0.22 | | | | | | |
| Acetic | 0.025 | 813.5 | 500 | 0.77 | 5.4 | 0.107 | 14.5 |
| Citric | 0.57 | 3120 | 2000 | 1.27 | 9.0 | 0.125 | 0 |
| Acetic | 0.10 | | | | | | |
| Citric | 0.29 | 2560 | 2000 | 0.93 | 14.88 | 0.123 | 3 |
| Acetic | 0.67 | | | | | | |
| Acetic | 0.05 | 700 | 500 | 1.08 | 6.5 | 0.118 | 5.6 |
| Ethylene-Maleic Acid Copolymer | 0.007 | | | | | | |

It will be observed that with only the monoprotic acid, i.e. acetic, a lower crush strength is obtained and a high shrinkage is obtained. By contrast, when mixtures of citric and acetic acid were used a higher crush strength (14.8 lbs) and a reduced shrinkage were obtained. Very desirable results were also obtained in the other test showing a mixture of citric and acetic acids wherein a crush strength of 9.0 pounds was obtained with no shrinkage.

EXAMPLE 3

100 g of CATAPAL alumina having the properties described hereinbefore and produced by the water hydrolysis of aluminum alkoxides produced by the Ziegler process was mixed with 0.107 g (0.0173 equivalents) of ammonium oxalate in aqueous solution. Thereafter 2.10 g (0.035 equivalents) of acetic acid was added with mixing. Sufficient water to form a paste was then added and mixed to form a mixture of uniform consistency. The mixture was extruded and dried at 250°F for about 24 hours and thereafter calcined at 900°F for 3 hours. The extrudates had a final shrinkage of about 7.5 percent, a bulk density of 36 lb/ft$^3$, a pore volume of 0.54 cc/g and was stable in water.

A comparative test using no ammonium oxalate produced extrudates having a shrinkage upon drying of about 19.5 percent.

EXAMPLE 4

CATAPAL alumina was mixed with 0.645 g (0.0098 equivalents) of ammonium sulfate per kilogram of alumina, 20 cc (0.34 equivalents of $HNO_3$) of 70 percent nitric acid per kilogram of alumina and sufficient water to form a paste and extruded. The extrudates were dried and calcined as in Example 1 and had a bulk density of 35 lb/ft$^3$, a pore volume of 0.59 cc/g and good stability in water.

EXAMPLE 5

1000 g of CATAPAL alumina was mixed with 10 g of methyl cellulose. 2.7 g (0.0436 equivalents) of ammonium oxalate was mixed with 250 cc of water and mixed with alumina. 10 cc (0.175 equivalents) of acetic acid was mixed with 250 cc of water and mixed with the alumina. An additional 140 cc of water was then admixed with the alumina to form an exturdable paste. The extrudates did not show excessive shrinkage and had superior hardness properties.

Examples 3 and 4 demonstrate the utility of salts of polyprotic acids and Example 5 further demonstrates that other materials may be admixed with the alumina to further modify the extrudate properties.

Having thus described the invention, I claim:

1. A method for producing alpha alumina monohydrate extrudates, said method consisting essentially of:
    a. admixing with alpha alumina monohydrate from about 0.01 to about 1.1 equivalents per kilogram of $Al_2O_3$ of a monoprotic acid, selected from the group consisting of hydrochloric acid, nitric acid, formic acid, propionic acid, monochloroacetic acid, dichloroacetic acid, trichloroacetic acid and salts of said acids wherein the cationic portion of said salts is selected from the group consisting of metallic ions and ammonium, from about 0.01 to about 2.75 equivalents per kilogram of $Al_2O_3$ of a polyprotic acid selected from the group consisting of oxalic acid, malonic acid, sulfuric acid, succinic acid, glutaric acid, adipic acid, maleic acid, fumaric acid, tartaric acid, salts of said acids wherein the cationic portion of said salts is selected from the group consisting of metallic ions and ammonium and anhydrides of maleic, succinic, glutaric and adipic acid and from about 0.4 to about 1.8 liters per kilogram of $Al_2O_3$ of water to form a putty-like extrudable mixture,
    b. extruding said mixture, and
    c. recovering alpha alumina monohydrate extrudates.

2. The method of claim 1 wherein said alpha alumina monohydrate contains from about 70 to about 80 weight percent $Al_2O_3$ and has a loose bulk density greater than about 35 lb/ft$^3$.

3. The method of claim 2 wherein from about 0.4 to about 0.8 liters of water per kilogram of $Al_2O_3$ is used.

4. The method of claim 1 wherein said monoprotic acid is selected from the group consisting of acetic acid and nitric acid.

5. The method of claim 4 wherein said monoprotic acid is present in an amount equal to from about 0.05 to about 0.55 equivalents per kilogram of $Al_2O_3$.

6. The method of claim 1 wherein said polyprotic acid is selected from the group consisting of oxalic acid, maleic acid, sulfuric acid and citric acid.

7. The method of claim 1 wherein said salts of said polyprotic acids are selected from the group consisting of the sodium, potassium and ammonium salts of said acids.

8. The method of claim 6 wherein said polyprotic acid is present in an amount equal to from about 0.05 to about 1.4 equivalents per kilogram of $Al_2O_3$.

9. The method of claim 1 wherein said alpha alumina monohydrate is produced by a process comprising:
    a. contacting an aqueous alumina slurry produced by the water hydrolysis of aluminum alkoxides with a suitable organic solvent having a lower surface tension than water to form an aqueous alumina-organic solvent mixture, and
    b. drying said aqueous alumina-organic solvent mixture to produce alpha alumina monohydrate having a loose bulk density from about 10 to about 35 lb/ft$^3$, and wherein said alpha alumina monohydrate is dried to an $Al_2O_3$ content from about 80 to about 100 weight percent $Al_2O_3$.

10. The method of claim 1 wherein said alpha alumina monohydrate is produced by the water hydrolysis of aluminum alkoxides.

* * * * *